Oct. 15, 1968 G. H. STUDTMANN 3,406,328

STATIC INVERTER CARRIER SYSTEM

Filed April 28, 1966 4 Sheets-Sheet 1

INVENTOR.
George H. Studtmann
BY
Peter S. Lucyshyn
Attorney

MODULATOR 14

INVENTOR.
George H. Studtmann
BY
Peter S. Lucyshyn
Attorney

Oct. 15, 1968 G. H. STUDTMANN 3,406,328

STATIC INVERTER CARRIER SYSTEM

Filed April 28, 1966 4 Sheets-Sheet 3

INVENTOR.
George H. Studtmann
BY
Peter S. Luczyshyn
Attorney

INVENTOR.
George H. Studtmann
BY
Peter S. Lucyshyn
Attorney

United States Patent Office 3,406,328
Patented Oct. 15, 1968

3,406,328

STATIC INVERTER CARRIER SYSTEM

George H. Studtmann, Mount Prospect, Ill., assignor to Borg-Warner Corporation, Chicago, Ill., a corporation of Illinois Filed Apr. 28, 1966, Ser. No. 545,906
5 Claims. (Cl. 321—45)

ABSTRACT OF THE DISCLOSURE

An inverter 11 has the positive-going and negative-going portions of its output square wave voltage waveform determined in time by signals received from a square wave generator 15, in its turn governed by trigger signals produced by a modulator 14. A reference signal 50, having positive- and negative-going portions, is applied to the modulator 14 to determine the times of occurrence of the trigger signals. Circuit means 89, 90, 109, 110 is provided in the modulator to establish the maximum frequency of the trigger pulses and correspondingly determine the maximum frequency of the inverter output voltage, which is also the normal frequency of the output signal produced by the inverter when no reference signal is applied to the modulator. Additional circuit components 94, 95, 114 and 115 cooperate with the just-described circuit means when a reference signal is received at input terminals 91, 92 to modulate the frequency (or regulate the time duration of the different polarity alternations) of the inverter output signal. Because of the circuit connections the only adjustment that can be effected in the inverter output signal is an increase of the time duration of the respective polarity alternations.

The present invention relates to a static inverter system and more particularly to a new and novel control for operating an inverter in such a system.

Certain uses of inverters, for example in motor speed control, require that the frequency of the inverter output be varied for selection of different motor speeds. Because the impedance of an inductive circuit changes with frequency, in order to prevent saturation of the magnetic core at low frequencies, the magnitude of the output signal must be independently controlled. Other instances of inverter use require a high-powered amplification and faithful reproduction of a reference or control signal. Though inverters are capable of high power output, controlling the output to reproduce an amplified input presents problems.

It is accordingly an object of the present invention to provide a static inverter system responsive to a reference or control signal to produce an output signal having positive and negative alternations selectively adjustable in time span so that upon integration, a resultant signal is substantially a reproduction of the control signal having the same frequency and a proportional magnitude.

It is a more detailed object of the present invention to provide a modulator in a static inverter system responsive to a reference or control signal for providing triggering pulses for an inverter to effect an amplified signal output from the inverter of the same frequency and a proportional magnitude to the reference signal.

It is an over-all object of the present invention to provide a static inverter system including a modulator responsive to a reference signal which is easily adapted for triggering standard type inverters and is economical to manufacture and easy to maintain.

Other objects and advantages of the present invention will become apparent upon reading the subsequent detailed description and upon reference to the drawings in which.

FIGURES *4a–4c* are respective plots of signals;

FIGURE *4a* is a plot of a reference signal;

FIGURE *4b* is a plot of a modulator output signal; and

Figures 1, 2, 6:
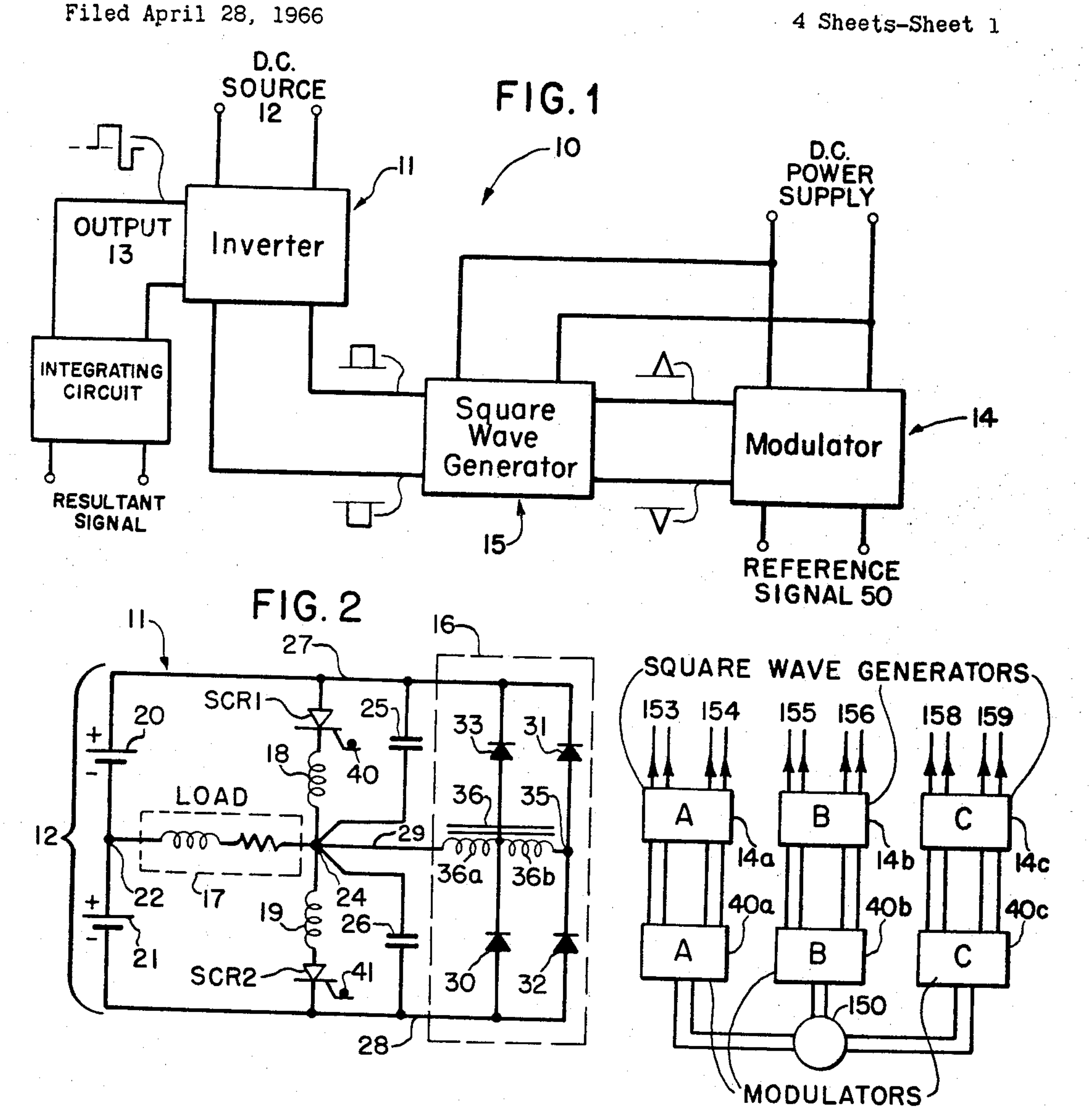
FIGURE 1 is a block diagram of a static inverter system embodying the present invention.
FIGURE 2 is a circuit diagram of an exemplary inverter which may be used in the system of FIGURE 1.
Figure 7:
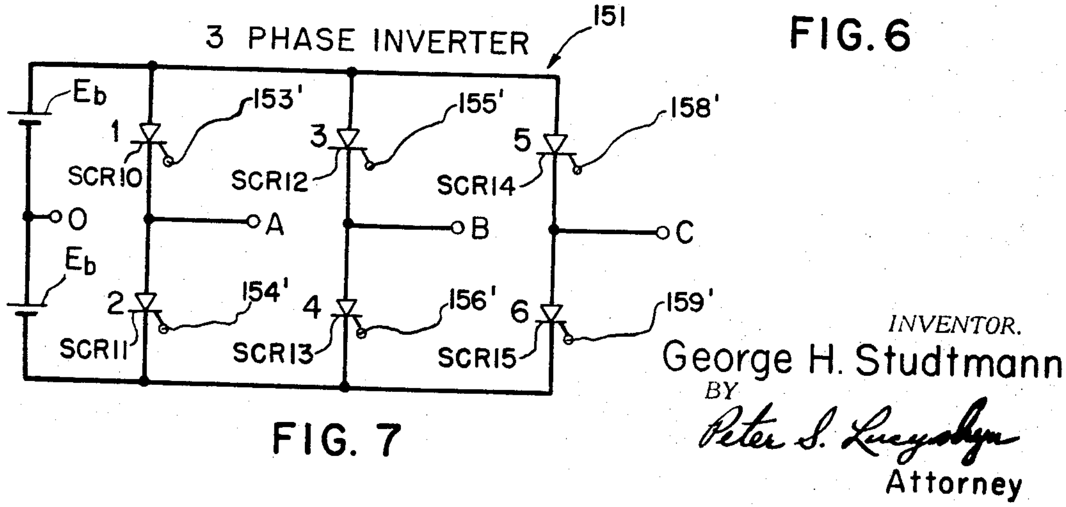
Figures 4A, 4B, 4C, 5A, 5B, 5C:
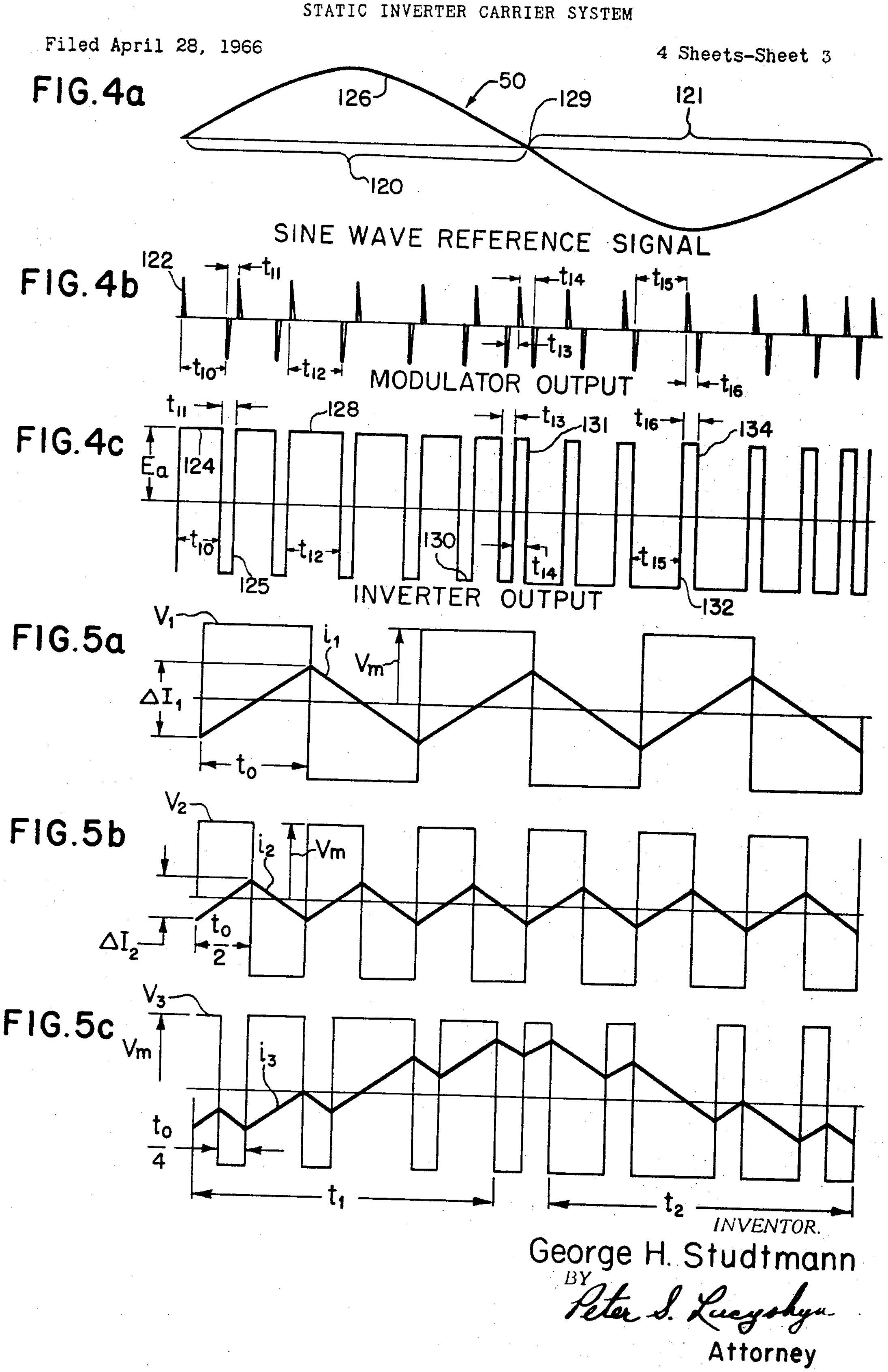

FIGURE *4c* is a plot of an inverter output signal;

FIGURES *5a–5c* are respective plots of signals aiding in understanding the present invention;

FIGURE *5a* is a plot of a voltage of a first frequency and a plot of a resultant current when that voltage is applied to an inductor;

FIGURE *5b* is a plot of a voltage of twice the frequency of the voltage of FIGURE 5a and a plot of a resultant current when that voltage is applied to an inductor;

FIGURE *5c* is a plot of a modulated voltage and a plot of a resultant current when that voltage is applied to an inductor;

FIGURE 6 is a block diagram of the modulator adapted for use in a three-phase system; and FIGURE 7 is a circuit diagram of the inverter responsive to triggering signals from the modulator of FIGURE 6 to effect a three-phase output.

FIGURES *8a–8f* are respective plots of voltages in a three-phase inverter.

Prior to describing an exemplary structure embodying the present invention, it is helpful to review the problem in energizing a load such as an inductor. There is shown in FIGURE *5a*, a voltage $V_1$ having respective positive and negative alternations and a maximum value of $V_m$. That voltage applied to an inductor will effect a current flow through the latter, and because the inductor acts as an integrator, the instantaneous value of the current will follow a curve as identified by a reference character $i_1$. The voltage in FIGURE *5a* has a frequency such that each half-wave alternation has a time span of $t_o$. With a voltage of maximum value $V_m$ applied to the inductor for the time period $t_o$, the current $i_1$, has a total excursion of $\Delta I_1$.

Shown in FIGURE *5b* is a second voltage $V_2$ having the same maximum value $V_m$ as does voltage $V_1$, however, the respective positive and negative alternations have only one-half the time span, $t_o/2$ that do the positive and negative alternations of voltage $V_1$. The resultant current flow in that inductor is represented by a plot $i_2$. Because the respective alternations of the voltage $V_2$ have the time span of $t_o/2$, the current builds up to only one-half the quantity.

A reference character $\Delta I_2$ identifies the total excursion of current $i_2$. Comparing $\Delta I_1$ with $\Delta I_2$, the total excursion of the current is greater for a lower frequency, assuming a constant maximum voltage. As is well known in the art, an inductor with a magnetic core has a saturation value which limits the maximum current that can be fed into it. Thus, if it is desired to operate an inductor efficiently without excessive heating at a lower frequency signal, the current in the inductor must be maintained below the permitted maximum saturation value.

Shown in FIGURE *5c* is a modulated voltage $V_3$. The same scale is used as in FIGURES *5a*, *5b*, so that respective current changes have the same slope. The minimum time span of a voltage alternation is selected to be $t_o/4$. If the voltage $V_3$—having a maximum value of $V_m$—is applied to the same inductor as the respective voltages $V_1$, $V_2$, a current $i_3$ will flow through the inductor. Because the load is an inductor and acts as an integrator, the current $i_3$ is determined by a volt-time integration of the respective voltage alternations. The current $i_3$ has respective rising and falling portions, and as noted, these have the same slope as the currents $i_1$ and $i_2$, the direction being determined by the polarity of the voltages, i.e., positive alternations causing the current to increase and negative alternations causing it to decrease. If positive alternations of the voltage $V_3$ have relatively longer time spans than the negative alternations, the current $i_3$ increases. This is represented by the portion of $i_3$ during the time period $t_1$. On the other hand, if the negative alternations of the voltage have longer time spans, the current $i_3$ decreases. This is represented by the plot of $i_3$ during the time period $t_2$. Thus, even though there are several alternations of the voltage, eight "cycles" to be exact, the resultant current $i_3$ has an excursion of only one cycle. As is explained in detail subsequently, the present inventive structure controls the time span of respective positive and negative alternations of an inverter output, as represented in FIGURE 5*c*, so that upon feeding of that signal to an integrating type load a resultant signal of a predetermined frequency and magnitude is effected.

Turning to FIGURE 1, there shown is a static inverter system generally designated by the reference character 10, embodying the present invention. The system 10 includes an inverter 11 energized by a D–C source 12 and having an output signal 13. The inverter is triggered by a modulator 14 which, in the present instance, provides a pulse output shaped by a square-wave generator 15 to effect triggering of switching devices in the inverter 11.

Shown in FIGURE 2 is a circuit diagram of an exemplary inverter 11. The inverter there shown is of the bridge type and includes a spill-over circuit 16 necessary for efficient operation of the inverter when energizing an inductive load 17. The inverter includes respective silicon controlled rectifiers SCR1, SCR2, connected in series with inductor coils 18, 19, respectively, which are magnetically coupled. The series network of silicon controlled rectifiers and inductor coils are connected across the D–C source 12, which in the exemplary circuit is comprised of equipotential batteries 20, 21, each having a voltage $E_a$.

The A-C output 13 of the inverter appears across network junction points 22, 24—point 22 being between respective batteries 20, 21, and point 24 being between the series connection of SCR1 and inductor 18, and the series connection of SCR2 and inductor 19. Across each of the respective series circuits of silicon controlled rectifiers and inductors are respective capacitors 25, 26. The spill-over or clamping circuit 16 is connected to the inverter D-C source 12 by a pair of conductors 27, 28, respectively, and to the aforedescribed junction point 24 by a conductor 29. The clamping circuit includes a set of four diodes 30, 31 and 32, 33, connected in a bridge network. Coupled between a pair of junctions 24, 35 of the bridge network is an auto-transformer 36 having respective winding portions **36*a*, 36*b*, the winding 36*a* being used as a primary and the winding 36*b*** being used as a secondary.

Explaining the operation of the inverter 11, SCR1 is forward biased by source 12 and conducts upon receiving a gating pulse at a gate 40. As is clear from the circuit diagram of FIGURE 2, when SCR1 is conducting, current is supplied through the inductor 18 to the load 17. The capacitor 25 has a very low voltage across it, for practical purposes zero volts, because the reactance of inductor 18 is very small. Capacitor 26 is charged to the value of the D-C source voltage, in the present instance $2E_a$ volts. SCR2 is not conducting at this time.

Assuming that at a subsequent time a gating pulse is received by SCR2 at a gate 41, SCR2 conducts and capacitor 26 applies a voltage of $2E_a$ volts to inductor 19. Because of the magnetic coupling between the respective inductors 19 and 18, a voltage $2E_a$ volts simultaneously appears across inductor 18, thereby reverse biasing SCR1 and turning it off. Because energy must be conserved, the current previously flowing in inductor 18 at the time of switching is transferred to inductor 19. While SCR2 conducts, capacitor 26 discharges toward zero. At the same time, capacitor 25 charges toward a voltage of $2E_a$ volts.

The action of both capacitors results in current flow both in load 17 and inductor 19. The rates at which capacitors 25, 26, respectively, charge and discharge are selected to assure sufficient turn-off time for SCR1 permitting it to regain its blocking ability.

A common induction motor presents a sufficient inductive load so that at switching, though voltage may be reversed, current continues to flow in the same direction for a period of time related to the load power factor. This presents problems which, as is explained subsequently, are solved by the spill-over portion of the inverter circuit.

At the time the capacitor 26 reaches zero volts and a capacitor 25 reaches $2E_a$ volts, current in inductor 19 is at a maximum value and begins to decrease. Because of the relationship $$e = L\frac{di}{dt}$$

a decrease in current changes the polarity of the voltage across inductor 19. Should current be permitted to continue decreasing in an unattenuated manner, the voltage across inductor 19 would approach a very high value and produce high voltage spikes. To avoid this problem and in addition to provide a flow path for reactive energy in load 17, the network 16 is incorporated into the inverter 11. The primary **36*a* and secondary 36*b* of the auto-transformer 36 are related by such a ratio that when the above-noted reverse polarity voltage across inductor 19 reaches a relatively small nominal value, for example 10 percent of $2E_a$ volts, the voltage on the secondary winding 36*b* has increased to the D-C bus or source voltage. The diode 31 is thereby biased to conduction. As a result, the secondary winding 36*b* is clamped at the D-C source voltage of $2E_a$ volts, thereby clamping the primary 36*a* at the nominal predetermined voltage. The energy trapped in inductor 19 feeds back into the primary of auto-transformer 36 and subsequently back to the D-C source. In addition, during the so-called spill-over interval, the current may also flow into the load through diode 30 and transformer primary 36*a*. In this manner the voltage across inductor 19** is clamped; the energy therein is regained; and a path is provided for the reactive current flow.

The reactive load current, lagging the voltage across the load, decreases to zero and reverses direction, thereafter flowing through inductor 19 and SCR2. The time at which this occurs depends on the load power factor. Of course, when the on-coming SCR, in the exemplary instance SCR2, turns on, the load current has not yet switched. It is therefore necessary to provide a gating signal for that SCR, assuring its operation when the current desires to flow therethrough. The square-wave generator provides a long gating pulse to maintain the SCR on for a sufficient period of time.

Subsequently, when a gating pulse is received at gate 40 of SCR1, the commutation occurs in reverse. Current is transferred from inductor 19 to inductor 18; the capacitor 25 discharges toward zero, while capacitor 26 charges toward $2E_a$ volts; and the diode 33 is biased to conduction to clamp the secondary winding **36*b* and thereby hold the primary 36*a*, at a predetermined voltage to prevent negative voltage spikes being produced by inductor 18**.

In accordance with the present invention, the static inverter system 10 includes a trigger signal producing means for selectively varying the point in time that respective switching devices in the inverter 11 are fired as a function of a reference signal, thereby to control the time span of the respective positive and negative alternations of the inverter output signal. As herein illustrated, the trigger signal producing means includes the modulator 14 responsive to a reference signal 50 for producing pulses which are fed to the square-wave generator 15 which provides the square-wave pulse signal necessary to trigger the particular switching devices SCR1, SCR2 used in the exemplary inverter 11 energizing the inductive load 17. Square-wave pulse generators of the type used in this circuit are well known and need not be described in detail. It is, of course, within the teachings of the present invention to incorporate circuit elements in the modulation circuit to effect the desired square wave pulse signals for triggering SCR's.

Figure 3:
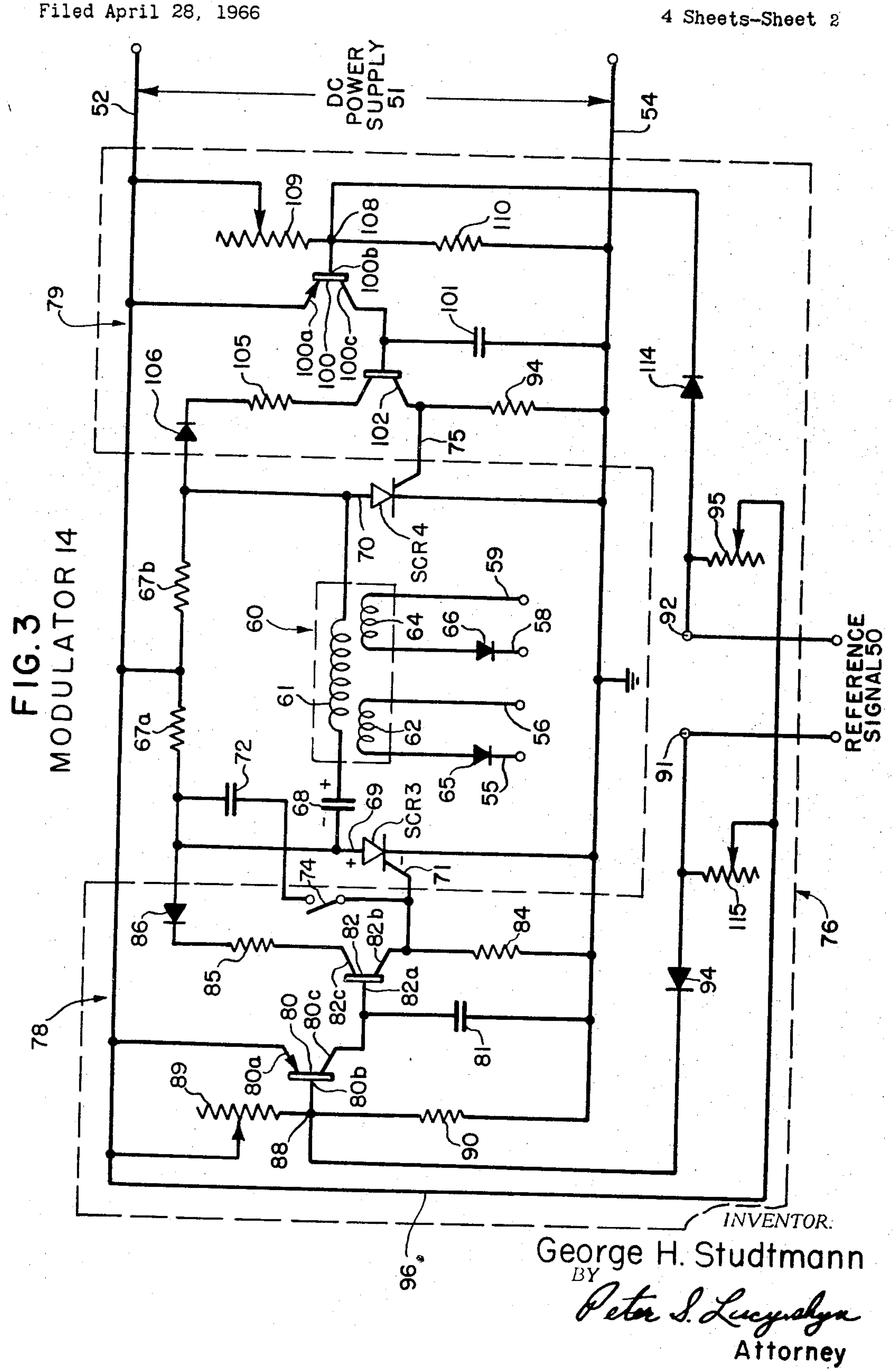
FIGURE 3 is a circuit diagram of a modulator embodying the teachings of the present invention which may be used in the system of FIGURE 1.

Turning to FIGURE 3, and the circuit diagram of the modulator 14, the latter is coupled to a D-C source 51 by lines 52, 54. Opposite polarity pulses (see FIGURE 4*b*) appear across modulator output lines 55, 56, and 58, 59. For producing these pulses a transformer 60 having a primary winding 61 and a pair of secondary windings 62, 64 is energized by the modulator. As is explained subsequently, current flow in primary winding 61 is effected first in one direction and later in the opposite direction. Though current flow in either direction in the primary winding induces voltages in each of the secondary windings, a diode 65 in line 55 and a diode 66 in line 58 assures that each set of output lines feeds out pulses of only one polarity. Thus, the secondary windings are responsive to the direction of current flow in the primary winding. This is necessary because pulses of one polarity from the modulator are utilized to trigger one of the inverter switching devices and pulses of the other polarity from the modulator are utilized to trigger the other switching device.

For switching current through the primary winding 61 from one direction to the other, thereby providing first and second opposite polarity portions to trigger the inverter, the exemplary modulator has a pair of silicon controlled rectifiers SCR3, SCR4. The silicon controlled rectifiers are connected so as to be normally forward biased by D-C source 51. Accordingly, a gating pulse applied to either one results in conduction through that silicon controlled rectifier. To limit current flow through the respective SCR's when they conduct, respective resistors **67*a*, 67*b* are connected between source line 52** and SCR3, and SCR4, respectively.

For commutating SCR3 and SCR4, a capacitor 68 is connected in series with the transformer primary winding 61 and between anode 69 of SCR3 and anode 70 of SCR4. SCR3 is gated to conduction by applying a pulse to its gate 71. To this end, a capacitor 72 and switch 74 are connected in series between D-C terminal 52 and gate 71. Closing of switch 74 effects application of a pulse to gate 71. While SCR3 is conducting, capacitor 68 charges to a polarity as shown in FIGURE 3. At a subsequent time, if a pulse is applied to a gate 75 of SCR4, the latter conducts. As a result, the voltage on capacitor 68 of the indicated polarity is applied across the series combination of transformer 60 and SCR3, reverse biasing the latter. Accordingly, SCR3 is turned off.

As is clear from the circuit diagram of FIGURE 3, when SCR4 instead of SCR3 conducts, the current through primary winding 61 is reversed. As a result, a pulse is provided by one of the secondary windings, for example winding 64. The capacitor 68 charges while SCR4 conducts to a voltage having a polarity opposite to that indicated in FIGURE 3.

At a later time when SCR3 receives a gating pulse and is again turned on, the voltage appearing across capacitor 68 is applied to the series combination of transformer 60 and SCR4 reverse biasing the latter, turning it off. The current again reverses in the primary winding and a pulse is provided by the other of the secondary windings, for example winding 62.

For timing the occurrence of the modulator output pulses, the modulator includes a timing circuit 76 responsive to the reference signal. The timing circuit includes a pulse output subcircuit 78 for gating SCR3 and a pulse output subcircuit 79 for gating SCR4. These circuits are cross-coupled and operate so that if one subcircuit has initiated a signal comprising a first portion of the modulator output, the other subcircuit starts timing to subsequently initiate a signal comprising a second portion of the modulator cyclical output.

Turning first to subcircuit 78, the latter includes a transistor 80 having an emitter **80*a*, a base 80*b* and a collector 80*c*. The transistor acts as a current control device thereby timing the charging rate of a capacitor 81. The latter is coupled to a discharge device herein shown as in unijunction transistor 82** which provides the pulse for gating SCR3.

As is known by those skilled in the art, a unijunction transistor is a semi-conductor device which has a pair of ohmic contacts, a base-one, a base-two and a rectifying contact, an emitter. The ohmic contacts are connected across a source of unidirectional voltage. When a voltage is applied across the emitter and base-one equal to a peak-point triggering voltage of the unijunction transistor, a current is permitted to flow. Of course, other types of devices responsive to a build-up of voltage on a capacitor, for example a neon bulb, could be used to provide a timed pulse to gate the silicon controlled rectifier.

In the present instance, the unijunction transistor 82 includes an emitter **82*a*, a base-one 82*b*, and a base-two 82*c*. Base-one 82*b* is connected through a load resistor 84 by the conductor 54 to one side of the D-C source 51. The base-two 82*c* is connected through a current limiting resistor 85, a negative voltage spike blocking diode 86, and the conductor 52 to the other side of D-C source 51. The firing capacitor 81 is connected between emitter 82*a* and conductor 54, across resistor 84, so that when the voltage across the capacitor builds up to a peak-point voltage determined by the voltage drop across the interbase resistance of base-one 82*b* and resistor 84, the UJT 82 is biased to conduction. As a result, a voltage pulse appears across resistor 84 which is fed to gate 71** of SCR3.

Turning to the biasing network for the transistor 80, the base **80*b* is connected to a junction point 88 between a pair of voltage divider resistors 89 and 90. The latter are connected across the D-C source 51 with the resistor 89 being adjustable to select the voltage drop across resistor 90 and as a result the bias on transistor 80. The transistor base 80*b* is biased to charge capacitor 81** at a maximum rate thereby fixing a predetermined time span for initiation of pulses for triggering of SCR3. It is necessary to fix a maximum or basic pulsing rate in the timing circuit because silicon controlled rectifiers, used in an inverter, have a minimum time limit in which they may be switched efficiently and reliably.

For increasing the time required to charge capacitor 81 and thereby increase the time span for initiation of a signal output from SCR3, a first portion of the reference signal 50 is applied to base **80*b* of the transistor. To this end, the received reference signal is applied across a pair of terminals 91, 92, coupled to the respective timing subcircuits 78, 79. For feeding one polarity of the reference signal 50 to subcircuit 78, terminal 91 is connected through a diode 94 to the base junction point 88. The latter is also connected to one side of the adjustable resistor 89. The other reference signal terminal 92 is connected through an adjustable load matching resistance 95 and a conductor 96 to source line 52 and the other side of the resistor 89. As a result, an increase in the magnitude of the reference signal affects the bias on transistor 80 so as to reduce its conduction ability. As less current is permitted to flow through transistor 80, the period of time required to charge capacitor 81 is increased. If the reference signal decreases to zero, it has no effect on the conduction ability of transistor 80, and the preselected adjustment of the bias on transistor 80 determines the charging rate for capacitor 81. Also, if the reference signal changes polarity, the diode 94 prevents the application of signal to transistor 80** so that the latter can not be driven to increased conduction. Accordingly, the time span of the inverter output can only be adjusted in one direction, that is, the time span of the respective alternations can only be increased.

Turning now to subcircuit 79 for gating SCR4, the latter includes a transistor 100 having respective elements, an emitter 100*a*, a base 100*b* and a collector 100*c* for controlling current flow to a capacitor 101. The subcircuit 79 includes the same circuit elements as subcircuit 78. The capacitor 101 charges up to a voltage sufficient to fire a unijunction transistor 102 and thereby applies a signal to the gate 75 of SCR4.

The circuit elements in subcircuit 79 are given reference characters corresponding to those of like functioning elements in previously described subcircuit 78. It is thus unnecessary to denote each of these in the description. Summarizing, the diode 114 permits only one polarity of the reference signal to be fed to junction 108 and transistor base 100*b*. The portion of the reference signal permitted to flow through diode 114 is of opposite polarity to that portion of the reference signal permitted to flow through diode 94. Accordingly, each of the subcircuits 78, 79, respectively, is responsive to the magnitude of respective first and second portions of the reference signal, which portions are of opposite polarity.

Turning to FIGURES 4*a*–4*c* and the operation of the inverter system 10, one cycle of the reference signal 50 is shown in FIGURE 4*a*. A series of modulator output pulses or trigger signal 122 are shown in FIGURE 4*b*. The A-C output voltage waveforms of the inverter 11 is shown in FIGURE 4*c*. Three assumptions are made for purposes of facilitating explanation. It is assumed that a first portion 120 of the reference signal 50 is permitted to flow through diode 94 to effect firing of SCR3 and a second portion 121 of the reference signal is permitted to flow through diode 114 to effect firing of SCR4. It is further assumed that conduction by SCR3 results in a signal output from modulator secondary winding 62 and that conduction by SCR4 results in a signal output from the other modulator secondary winding 64. It is finally assumed that the modulator trigger signal from secondary winding 62 triggers the inverter SCR2 to conduction and the modulator trigger signal from the secondary winding 64 triggers the inverter SCR1 to conduction. Thus, the subcircuit 78 by controlling the point in time when SCR3 is triggered, controls the time span of that portion of the inverter output signal resulting from SCR1 conducting, and the subcircuit 79 controls the time span of the opposite polarity portion of the inverter output signal resulting from SCR2 conducting. The reason for this "cross-control" is because one SCR of the inverter continues to conduct and provide an output signal until the other SCR is triggered and the aforedescribed commutation occurs to turn the first conducting SCR off. It is of course a simple matter to reverse the feeding of the trigger signals from the modulator to select which of the time spans, either those of the positive or those of the negative alternations of the inverter output, the first portion of the reference signal controls.

Turning again to FIGURE 4*b*, a first modulator trigger signal or output pulse 122 resulting from SCR4 being fired initiates conduction by SCR1 and results in the beginning of the formation of the inverter output signal portion or alternation 124. As previously explained, the application of a first portion 120 of the reference signal (see FIGURE 4*a*) to the base 80*b* of transistor 80 results in reduction of current flow to capacitor 81. Accordingly, gating of SCR3 is delayed so that a time $t_{10}$ passes before it fires, and as a result, before SCR2 conducts. When the latter occurs, the positive alternation is complete and the negative alternation begins.

Because the first portion of the reference signal is not permitted to flow to subcircuit 79 by diode 114, the firing of SCR4 is not effected. Thus, the basic firing time of that timing circuit is not affected. As herein shown, a basic time period $t_{11}$ is selected for triggering the respective modulator SCR's. When SCR4 fires, a negative portion 125 of the inverter output is complete.

Summarizing, as the magnitude of the first portion 120 of the reference signal increases, the time span of the positive alternations of the inverter output are increased while the time spans of the negative alternations are maintained at a constant basic value. When the reference signal 50 increases to a maximum value, identified in FIGURE 4*a* as signal portion 126, the charging of capacitor 81 is delayed so that a time period $t_{12}$ is required to fire unijunction transistor 32. Thus, the time span $t_{12}$ of a positive alternation 128 of the inverter output is the longest.

The reference signal 50 passes through zero at a point 129 as shown in FIGURE 4*a*. At that time the reference signal has little effect on the bias of the respective timing subcircuits 78, 79. Thus, the trigger signal from the modulator initiates conduction by the inverter SCR's so as to provide respective negative and positive inverter output signals 130, 131, having approximately equal time spans of $t_{13}$, $t_{14}$.

When the opposite polarity portion of the reference signal 50 during the time period identified as 121 in FIGURE 4*a*, is applied to the modulator, the diode 114 permits current to flow to base 100*b* of transistor 100 while the diode 94 prevents the reference signal being applied to timing subcircuit 78. As a result, the gating of SCR4 is delayed and a negative alternation 132 of the inverter output has a relatively longer time span $t_{15}$. Because the firing of SCR3 is unaffected, the latter fires at the selected basic timing rate, thereby resulting in a positive alternation 134 having a time span of $t_{16}$. It is clear from the foregoing that the basic time spans $t_{11}$, $t_{13}$, $t_{14}$, and $t_{16}$ are equal.

The greater the number of cyclical variations, i.e., the number of pairs of positive and negative alternations, of the inverter output voltage during the course of one cycle of the reference signal, the better is the quality of the resultant, integrated signal as a reproduction of the reference signal. In FIGURE 4*c* there are thirteen cyclical variations of the inverter voltage for one cycle of the reference signal. The current $i_3$ in FIGURE 5*c* is a representation of an integrated or resultant signal after the modulated inverter output voltage $v_3$ is applied to a filtering circuit, including in that instance an inductor. It has been found in practtice, that a ratio of approximately 3 to 1 is a lower limit for the relationship of the respective frequencies of the inverter output voltage to the reference signal.

In light of the foregoing description, it is clear that the inverter system described herein can operate as a high-powered amplifier. The reference signal 50 which is fed into the modulator 14 can be of relatively low-power value as compared to the inverter output as shown in FIGURE 5*c*. The load 17 for receiving the inverter output must be such as to integrate the inverter output voltage. In other words, the load can not be directly responsive to the respective alternations of the inverter output voltage in the manner of a resistor. A filter network, for example an R-C circuit, can be used instead of an inductive load to integrate the output of the inverter to produce a resultant signal which generally follows the reference signal.

The present inventive circuit permits a wide selection of inverter voltage outputs which can be easily controlled by a reference signal. The amplitude of the resultant signal can be regulated at any desired level by suitably sensing the inverter output and controlling the amplitude of the control or reference signal in accordance with the sensed signal. Amplitude control and regulation are achieved without additional power handling components. Furthermore, though a sine-wave reference signal has been shown in the present instance, the carrier inverter system herein described permits amplification of arbitrary wave shapes as long as these vary relatively slowly with respect to the carrier or basic unmodulated frequency of the system.

Because both the frequency and the amplitude of the resultant voltage are controllable, the present inverter system is well suited for speed control of A-C motors over a speed range from zero to rated speed. As has been explained, because of induction loading it is necessary to control both frequency and amplitude of applied voltage. The present carrier inverter easily accomplishes that end.

The present inventive inverter system has been described in the environment of single-phase operation. It is within the teachings of the present invention to adapt the system for use in a multi-phase inverter. For example, there is shown in FIGURES 6 and 7, a block diagram, and a circuit diagram, respectively, for utilizing the inverter system 11 in a three-phase installation. Shown in FIGURE 6 are three modulators 40*a*, 40*b*, and 40*c*, energizing respective square-wave generators 14*a*, 14*b* and 14*c*. The respective modulators are responsive to a three-phase reference signal 150. The modulators and square-wave generators correspond in construction and operation to the modulator 40 and square-wave generator 14 of the single phase unit already described.

Shown in FIGURE 7 is an inverter 151 responsive to the triggering pulses produced by the modulators and square-wave generators of FIGURE 6 to thereby effect a three-phase signal output. The inverter 151 includes in phase A an SCR10 and an SCR11; in phase B an SCR12 and an SCR13; and in phase C an SCR14 and an SCR15. These respective switching devices are coupled to receive D-C power from a source depicted as two batteries each supplying a voltage $E_b$ and respond to trigger signals from the respective square-wave generators 14*a*, 14*b*, and 14*c*. The commutating circuits and the reactive energy flow diodes for the three-phase inverter are not shown as the construction and operation of these are the same as that of the corresponding circuits of the single-phase inverter, previously described. Each of the square-wave generators has a pair of output conductors as represented by reference characters 153, 154; 155, 156; and 158, 159. The respective gates to which these output conductors are coupled are identified by the same numbers with the addition of a prime (′).

Figures 8A, 8B, 8C, 8D, 8E, 8F:
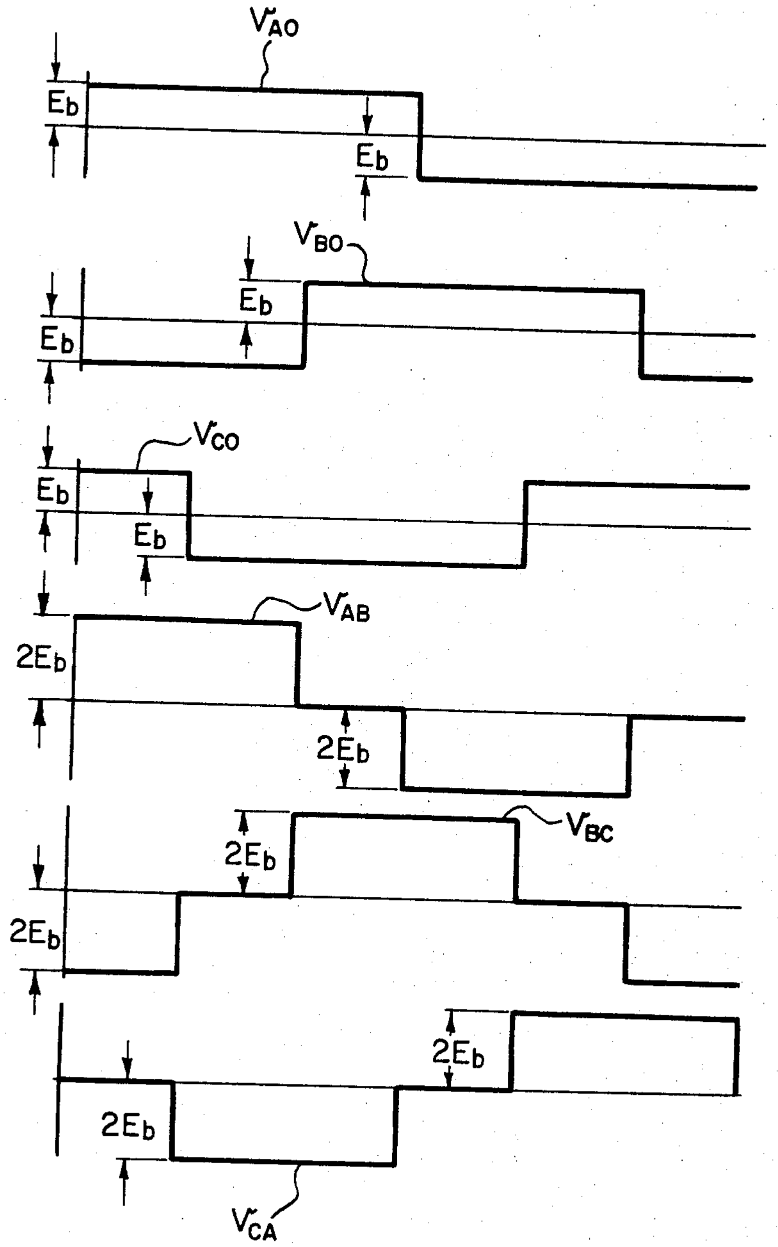

The voltage output of the three-phase inverter may be considered to be composed of three respective voltages, herein referred to as "phase" voltages, each displaced 120 electrical degrees with respect to the other two "phase" voltages. This relationship is shown in FIGURES 8*a*, 8*b and* 8*c*. The D-C source is shown "center-tapped," i.e., equal D-C voltages connected in series-adding on each side of terminal O and having a preselected value of $E_b$ volts. Unmodulated voltages $V_{AO}$, $V_{BO}$, and $V_{CO}$, as they would appear across respective terminals AO, BO, and CO (FIGURE 7) are plotted in FIGURES 8*a*, 8*b*, *and* 8*c*, respectively. Each has a maximum magnitude of $E_b$ volts. Line-to-line voltages $V_{AB}$, $V_{BC}$, and $V_{CA}$, respectively, plotted in FIGURES 8*d*, 8*e*, 8*f*, are algebraic summations of the respective phase voltages shown in FIGURES 8*a*–8*c*. The mathematical equations for summing these voltages, set forth in vector form, are as follows:

FIG. 8*d*.—$V_{AB}=V_{AO}+V_{OB}$ and $V_{AO}-V_{BO}$
FIG. 8*e*.—$V_{BC}=V_{BO}+V_{OC}$ and $V_{BO}-V_{CO}$
FIG. 8*f*.—$V_{CA}=V_{CO}+V_{AO}$ and $V_{CO}-V_{AO}$ As has been stated, the voltages $V_{AO}$, $V_{BO}$, $V_{CO}$, plotted in FIGURES 8*a*, 8*b*, and 8*c*, respectively, are unmodulated. Modulation would change each of the phase voltages to a form generally similar to the respective modulated output signals shown in FIGURES 4*c* and 5*c*. The algebraic summation for $V_{AB}$, $V_{BC}$, and $V_{CD}$ accordingly would be changed. The phase sequence of the line-to-line voltages $V_{AB}$, $V_{BC}$, $V_{CA}$, follows the phase sequence of the reference voltage. Reversal of the latter causes reversal of the output phase sequence and thereby effects reversal of rotation of a motor coupled thereto. Accordingly, the present carrier inverter system provides versatile control of a motor.

While the invention has been described in connection with a preferred embodiment, it is understood that I do not intend to limit the invention to that embodiment. On the contrary, I intend to cover the alternatives, modifications, and equivalents as may be included within the spirit and scope of the invention as defined by the appended claims.

I claim as my invention:

1. An inverter system for producing an output signal of a controllable first frequency and magnitude, integratable to provide a resultant signal, comprising:

an inverter connected for energization from a D-C voltage and operative in response to receipt of a trigger signal having respective first and second portions to produce said output signal having respective positive and negative alternations, and a modulator for producing said trigger signal, including input means connected to receive a reference signal of a second frequency which is different than said first frequency of the output signal, said reference signal having respective first and second opposite polarity portions, the first frequency of said inverter output signal being related to the second frequency of said reference signal by a predetermined ratio having a minimum limit value, said modulator being operative in response to variations in the magnitude of said reference signal to vary the time span between initiation of said respective first and second trigger signal portions, said reference signal first portion controlling the initiation of said trigger signal first portion and said reference signal second portion controlling the initiation of said trigger signal second portion, and circuit means in said modulator for establishing the minimum time duration of an alternation of the inverter output signal and for adjusting said time duration only in one sense, by increasing the time duration of an alternation beyond said minimum time duration.

2. The combination of claim 1 wherein said modulator includes a pair of semi-conductor switching devices coupled to each other through commutating means.

3. The combination of claim 2 wherein said semiconductor switching devices are gated individually by respective timing circuits.

4. The combination of claim 3 wherein said respective timing circuits are coupled to said input means for receiving said reference signal, which timing circuits selectively increase the points in time of initiation of said first portion of said trigger signal and said opposite polarity second portion of said trigger signal, respectively, as said reference signal first portion increases in magnitude to thereby increase the time span of one of the respective positive and negative alternations of the inverter output signal.

5. An inverter system for providing a resultant signal of controllable frequency and magnitude, comprising an inverter connected for energization from a D-C voltage and operative in response to receipt of a trigger signal to provide an alternating output signal, means coupled to said inverter for integrating said inverter output signal to produce the resultant signal, and means for providing said trigger signal comprising a modulator including a pair of semiconductor switching devices coupled to each other through a commutating means to provide a first portion and a second portion, respectively, of said trigger signal, individual circuit means for initiating conduction by each of said respective semi-conductor switching devices, which circuit means is selectively adjustable to effect occurrence of said first and second portions of said trigger signal at a basic frequency, input circuit means connected to receive a reference signal of predetermined frequency and magnitude and to apply said reference signal to said conduction initiating means to vary the time of initiation of said first portion of the trigger signal as a function of the magnitude of one polarity portion of said reference signal and to vary the time of initiation of said second portion of the trigger signal as a function of the magnitude of the opposite polarity portion of said reference signal, said modulated inverter output signal when integrated providing the resultant signal related to said reference signal by having the same frequency and a proportional magnitude, and circuit means in said modulator for establishing the minimum time duration of an alternation of the inverter output signal and for adjusting said time duration only in one sense, by increasing the time duration of an alternation beyond said minimum time duration.

References Cited

UNITED STATES PATENTS

| | | | |
|---|---|---|---|
| 3,052,833 | 9/1962 | Coolidge et al. | 321—5 |
| 3,310,730 | 3/1967 | Ruch | 321—18 |
| 3,324,376 | 6/1967 | Hunt | 321—8 XR |
| 3,334,292 | 8/1967 | King et al. | 321—45 |
| 3,350,637 | 10/1967 | Pochtar. | |
| 3,360,709 | 12/1967 | Etter | 321—45 XR |

OTHER REFERENCES

Turnbull, F. G.: Selected Harmonic Reduction in Static D-C-A-C inverters, July 1964, pp. 374–368, IEEE Paper #63-1011.

LEE T. HIX, *Primary Examiner.*

W. M. SHOOP, *Assistant Examiner.*